United States Patent
Kim et al.

(10) Patent No.: US 11,441,675 B2
(45) Date of Patent: Sep. 13, 2022

(54) INHIBITOR INTEGRATED ACTUATOR SHIFT CONTROL DEVICE

(71) Applicants: Kyung Chang Industrial Co., Ltd., Daegu (KR); SAM HYUN CO., LTD., Changwon-si (KR)

(72) Inventors: Dong Won Kim, Daegu (KR); Sung Joon Maeng, Daegu (KR); Dae Yeon Kim, Daegu (KR); Jin Heo, Busan (KR); Tae Keuk Choi, Changwon-si (KR); Jeong Seok Kim, Changwon-si (KR)

(73) Assignees: KYUNG CHANG INDUSTRIAL CO., LTD, Daegu (KR); SAM HYUN CO., LTD., Gyeongsangnam-Do (KR)

( * ) Notice: Subject to any disclaimer, the term of this patent is extended or adjusted under 35 U.S.C. 154(b) by 117 days.

(21) Appl. No.: 16/887,069

(22) Filed: May 29, 2020

(65) Prior Publication Data

US 2021/0088134 A1 Mar. 25, 2021

(30) Foreign Application Priority Data

Sep. 20, 2019 (KR) .................... 10-2019-0116204

(51) Int. Cl.
*F16H 61/32* (2006.01)
*F16H 1/32* (2006.01)
*F16H 63/30* (2006.01)

(52) U.S. Cl.
CPC .............. *F16H 61/32* (2013.01); *F16H 1/32* (2013.01); *F16H 63/304* (2013.01); *F16H 2001/327* (2013.01); *F16H 2061/326* (2013.01)

(58) Field of Classification Search
CPC .......... F16H 61/32; F16H 1/32; F16H 63/304; F16H 2001/327; F16H 2061/326; F16H 57/02; H02K 7/116; H02K 29/06; H02K 2211/03
See application file for complete search history.

(56) References Cited

U.S. PATENT DOCUMENTS 6,169,349 B1* 1/2001 Davenport ............. H02K 19/10
310/114
6,857,981 B2* 2/2005 Hori ........................ F16H 61/32
475/149

(Continued)

FOREIGN PATENT DOCUMENTS

JP 2016008633 A 1/2016
KR 20120000489 A 1/2012
(Continued)

OTHER PUBLICATIONS

Gi-Cheol Hyeon, et al., Written Decision on Registration corresponding to Korean Application KR 20190093552, 2021.

*Primary Examiner* — Victor L MacArthur
(74) *Attorney, Agent, or Firm* — Lucas & Mercanti, LLP (57) ABSTRACT

The present disclosure provides an inhibitor integrated actuator shift control device capable of controlling a position of a gear shift by improving control performance and durability through position control of a brushless direct current (BLDC) motor by an inductive sensor, forming a metallic uneven portion on an output shaft flange part of a reducer, and detecting a variation amount in induced current due to the metallic uneven portion.

8 Claims, 9 Drawing Sheets

(56) References Cited

U.S. PATENT DOCUMENTS

| | | | |
|---|---|---|---|
| 7,326,143 B2* | 2/2008 | Kimura | F16H 1/32 475/149 |
| 7,382,107 B2* | 6/2008 | Hori | F16H 61/32 318/432 |
| 7,446,499 B2* | 11/2008 | Kimura | F02N 19/005 318/599 |
| 8,729,769 B2 | 5/2014 | Takeuchi | |
| 9,321,172 B2 | 4/2016 | Johnson et al. | |
| 2006/0276300 A1* | 12/2006 | Kashiwagi | F16H 61/12 477/34 |
| 2009/0058208 A1* | 3/2009 | Kimura | H02K 5/1732 310/83 |
| 2009/0120222 A1* | 5/2009 | Kimura | F16H 63/3416 74/335 |
| 2020/0332889 A1 | 10/2020 | Makino et al. | |
| 2020/0336037 A1 | 10/2020 | Naitou et al. | |
| 2020/0336043 A1 | 10/2020 | Kume et al. | |
| 2020/0340578 A1 | 10/2020 | Shimada et al. | |

FOREIGN PATENT DOCUMENTS

| | | |
|---|---|---|
| KR | 20170035227 A | 3/2017 |
| KR | 20170118722 A | 10/2017 |
| KR | 20180086544 A | 8/2018 |
| WO | 2007043514 A1 | 4/2007 |
| WO | 2013062376 A2 | 5/2013 |
| WO | 2015000475 A2 | 1/2015 |
| WO | 2018064709 A1 | 4/2018 |

* cited by examiner

INHIBITOR INTEGRATED ACTUATOR SHIFT CONTROL DEVICE

CROSS-REFERENCE TO RELATED APPLICATION

This application claims priority to and the benefit of Korean Patent Application No. 2019-0116204, filed on Sep. 20, 2019, the disclosure of which is incorporated herein by reference in its entirety.

BACKGROUND

1. Field of the Invention

The present disclosure relates to an inhibitor integrated actuator shift control device capable of improving control performance and durability through position control of a brushless direct current (BLDC) motor by an inductive sensor, forming a metallic uneven portion on an output shaft flange part of a reducer, and detecting a variation amount in induced current due to the metallic uneven portion to control a position of a gear shift.

2. Discussion of Related Art

Generally, a driving actuator for electronic shift control includes a driving body composed of a stator and a rotor, and a reducer which transmits output by shifting high speed rotation of the driving body to low speed rotation.

Specifically, a conventional driving actuator is composed of a Hall sensor and a multi-pole magnetized permanent magnet for position control of a motor which is a driving body, and when an air gap is changed, the magnet and the Hall sensor are not only vulnerable to shock and heat due to generation of poor output thereof, but also cause problems such as a magnet demagnetization phenomenon due to heat effects and noise generation when foreign substances are attached to the magnet.

Further, in the case of the conventional actuator, a detection unit which detects a rotation angle of an output shaft is formed in a structure in which a Hall sensor mounted on a printed circuit board is provided, and a multi-pole magnetized permanent magnet is disposed at a facing position of the Hall sensor in the output shaft. In this case, since the output shaft moves slightly in a vertical direction according to an assembly state and an operation state of the output shaft, the magnet of the output shaft also flows in a vertical direction like the above. Accordingly, the size of an air gap between the Hall sensor and the magnet is changed, and thus sensing accuracy of the Hall sensor is degraded. Further, since the actuator is installed on an outer space, there is a problem that moisture and foreign substances inevitably permeate and thus a gear shift cannot be normally sensed. Further, as described above, the magnet is vulnerable to shock and heat and has a problem that a magnet demagnetization phenomenon occurs due to heat effects and noises are generated when the foreign substances are attached to the magnet.

(Patent Document 0001) U.S. Patent Registration No. 6857981 (registered on Feb. 22, 2005)

SUMMARY OF THE INVENTION

The present disclosure is directed to controlling a position of a gear shift by improving control performance and durability through position control of a brushless direct current (BLDC) motor by an inductive sensor, forming a metallic uneven portion on an output shaft flange part of a reducer, and detecting a variation amount in induced current due to the metallic uneven portion.

The present disclosure is directed to improving gear transmission efficiency by introducing a multifaceted teeth-shaped transmission unit configured to connect a sun gear and an output shaft of a reducer to transmit a rotational force to reduce a load resulting from eccentric rotation of the sun gear.

The present disclosure is directed to solving problems such as a magnet demagnetization phenomenon due to overheating and noise generation when foreign substances are attached to the magnet as rotation control including a conventional Hall sensor and multi-pole magnetized permanent magnet is vulnerable to shock and heat due to poor output thereof by introducing first and second inductive sensors not using a magnet.

The present disclosure is directed to solving a problem that a power transmission unit using a conventional cycloid teeth and circular protruding groove requires high machining precision and manufacturability, and thus an efficiency difference is large according to the precision and manufacturability by introducing a multifaceted teeth-shaped transmission unit axially orthogonal to a sun gear and an output shaft of a reducer so that gear transmission efficiency is improved and manufacturing becomes easy.

According to an aspect of the present disclosure, there is provided an inhibitor integrated actuator shift control device including: a first housing; a stator including a bobbin and a coil wound around the bobbin and disposed in the first housing; a rotor including a rotor core and a rotary shaft which is connected to the rotor core and provided with an eccentric portion at one end thereof, and disposed in the stator; a first inductive sensor including conductive couplers connected to the other end of the rotary shaft, and a sensor plate disposed in the first housing, and having a transmitter and a receiver disposed at positions facing the conductive couplers; a reducer including a sun gear connected to the eccentric portion of the rotary shaft to rotate eccentrically, a ring gear inscribed with the sun gear, and an output shaft connected to the sun gear to transmit a rotational force; a second housing in which the reducer is disposed; and a magnetically inductive second inductive sensor configured to detect a rotation angle of the output shaft.

The second inductive sensor according to the present disclosure may include a metallic uneven portion formed on the output shaft, and a printed circuit board provided in the second housing and having a transmission coil and a reception coil which are disposed to face the uneven portion.

The reducer according to the present disclosure may further include a multifaceted or multistage teeth-shaped transmission unit configured to connect the sun gear and the output shaft.

The multifaceted teeth-shaped transmission unit according to the present disclosure may include a multifaceted teeth-shaped groove formed in a disk portion of the sun gear, a flange part connected to the output shaft, and a multifaceted teeth-shaped protrusion formed on the flange part to be fitted into the multifaceted teeth-shaped groove.

The disk portion of the sun gear according to the present disclosure may further include a contact groove connected to the multifaceted teeth-shaped groove to come into contact with the flange part of the output shaft to expand a contact area.

The multistage teeth-shaped transmission unit according to the present disclosure may include external teeth inwardly forming a step with respect to outer teeth of the sun gear, the flange part connected to the output shaft, and internal teeth formed in the flange part to be inscribed with the external teeth.

An inner side portion of the flange part according to the present disclosure may be further provided with a contact surface portion which comes into contact with the disk portion of the sun gear.

The metallic uneven portion of the second inductive sensor according to the present disclosure may be formed on the flange part of the output shaft.

The conductive coupler of the first inductive sensor according to the present disclosure may include a single metal plate or a plurality of metal plates.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

In order to describe the present disclosure, operational advantages of the present disclosure, and purposes achieved by embodiments of the present disclosure, hereinafter, preferable embodiments of the present disclosure will be described and the present disclosure will be examined with reference to the preferable embodiments.

First, terms used in the present disclosure are used only to describe the particular embodiments, and not to limit the present disclosure, and the singular form may be intended to also include the plural form, unless the context clearly indicates otherwise. Further, it should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

In a description of the present disclosure, when specific descriptions such as related known functions or configurations related to the present disclosure unnecessarily obscure the spirit of the present disclosure, a detailed description of the specific descriptions will be omitted.

As shown in FIGS. 1 to 9B, an inhibitor integrated actuator shift control device according to the present disclosure includes a first housing 10, a stator 20, a rotor 30, a first inductive sensor 40, a reducer 50, a second housing 60, and a second inductive sensor 90.

That is, a driving actuator according to the present disclosure includes a driving body composed of the stator 20 and the rotor 30, and the reducer 50 which transmits output by shifting high speed rotation of the driving body to low speed rotation.

In this case, the driving body is disposed in the first housing 10, and the reducer 50 is disposed in the second housing 60.

Figure 1:
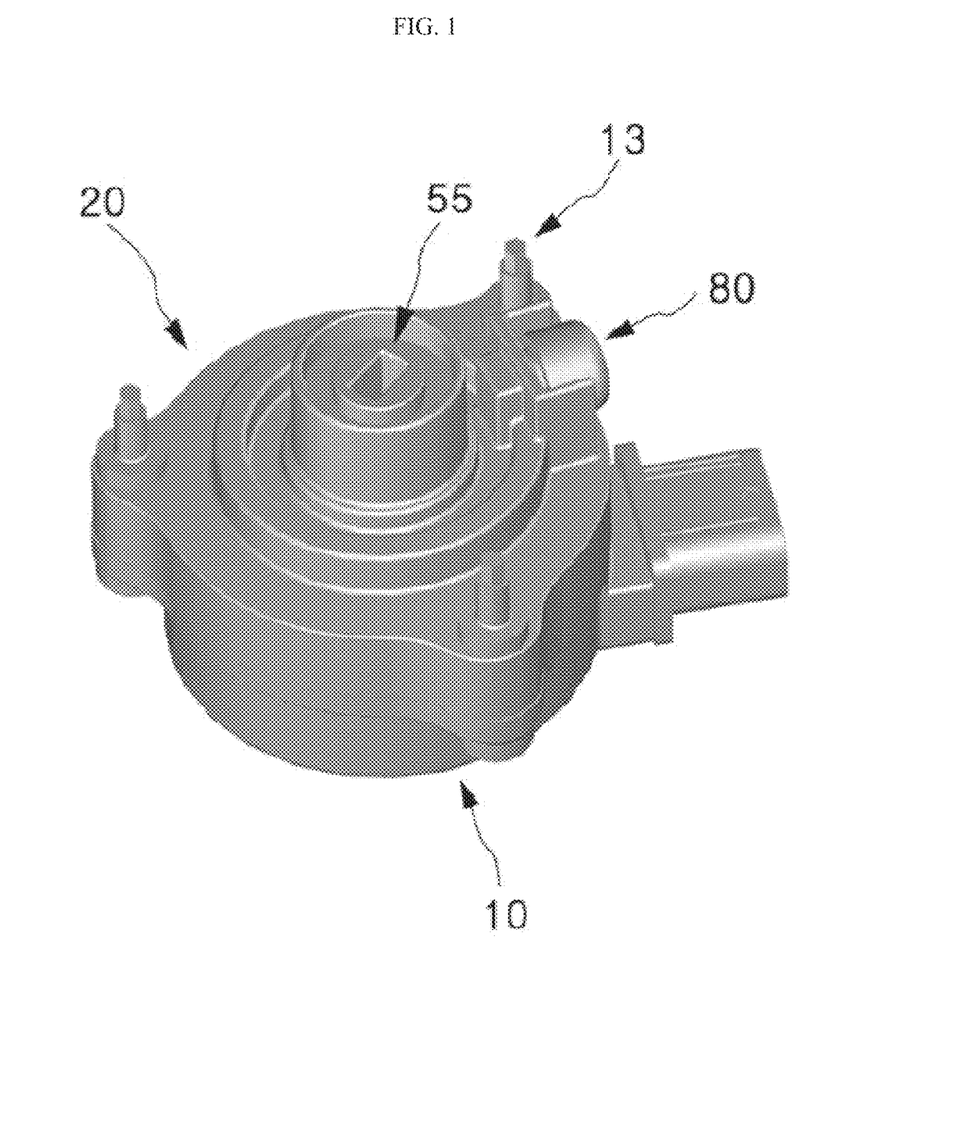
FIG. 1 is a perspective view illustrating an inhibitor integrated actuator shift control device according to the present invention.
Figure 2:
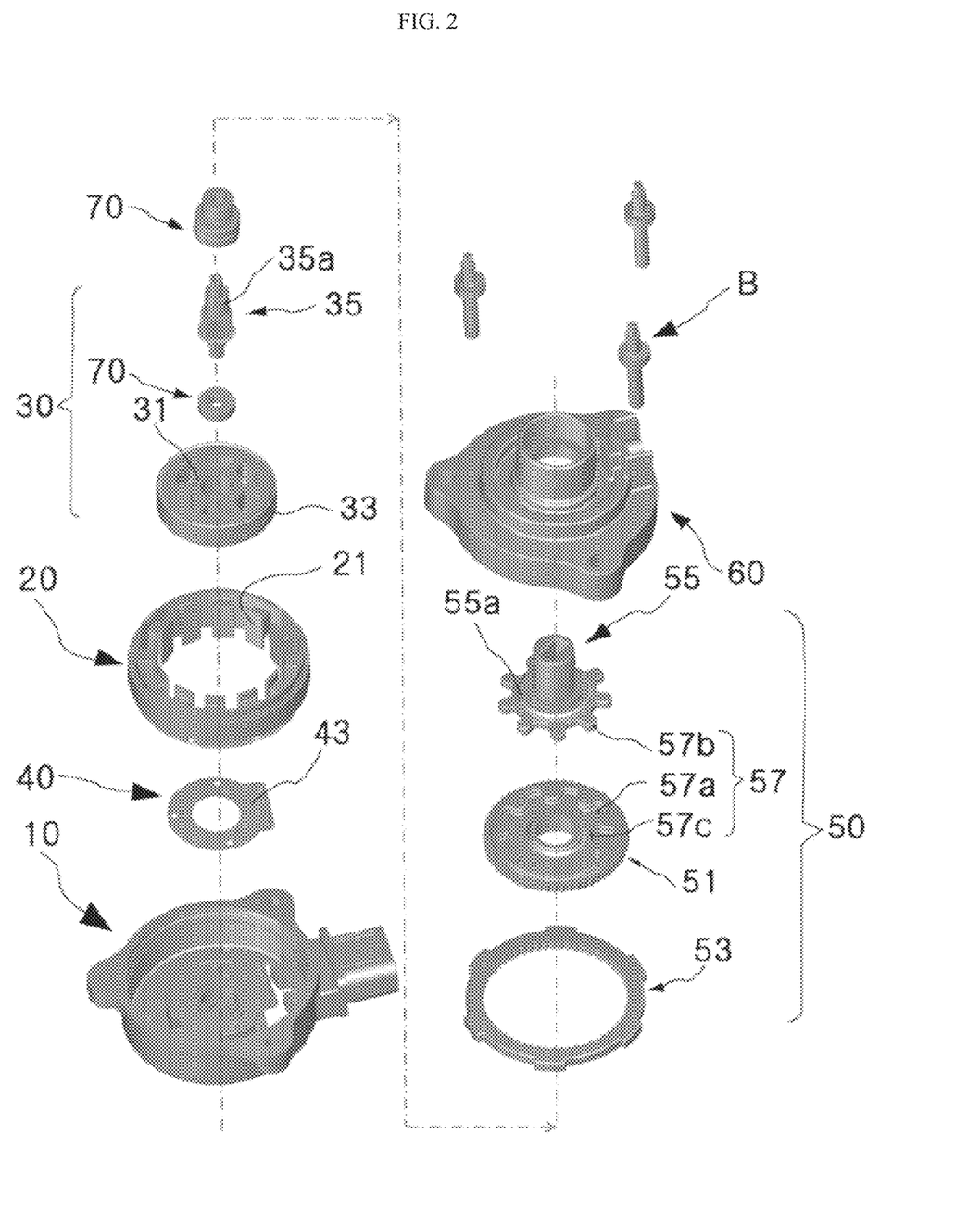
FIG. 2 is an exploded perspective view illustrating the inhibitor integrated actuator shift control device according to the present invention.

First, as shown in FIGS. 1 and 2, an accommodation space in which the stator 20 and the rotor 30 are disposed is formed in the first housing 10 according to the present disclosure. Further, the first inductive sensor 40 is disposed in the accommodation space, and to this end, a plurality of protrusion portions are formed at an inner side of the first housing 10, and a plurality of groove portions corresponding to the protrusion portions are formed in a sensor plate 43 of the first inductive sensor 40 to be coupled to the protrusion portions.

The stator 20 according to the present disclosure includes a bobbin 21 and a coil 23 wound around the bobbin 21, and is disposed in the accommodation space of the first housing.

Further, the rotor 30 according to the present disclosure is composed of a rotor core 31, a magnet 33 which surrounds the rotor core 31, and a rotary shaft 35 connected to a center of the rotor core 31. An eccentric portion 35a of which an axis is eccentric may be formed at an end portion of the rotary shaft 35, that is, an end portion facing a disposing position of the first housing 10. The eccentric portion 35a is connected to a sun gear 51 of the reducer 50 to allow eccentric rotation of the sun gear 51. Conductive couplers 41 of the first inductive sensor 40 are connected to the other end of the rotary shaft 35, that is, an end portion facing a disposing position of the eccentric portion 35a.

A plurality of bearings 70 are vertically disposed on the rotary shaft 35 of the rotor 30 configured in this way, and the bearings 70 are also disposed on the eccentric portion 35a of the rotary shaft 35 to support rotation of the rotary shaft 35. In this case, a through hole of the sun gear 51 is inserted onto the eccentric portion 35a of the rotary shaft 35, and in this case, in the bearings 70 disposed on the eccentric portion 35a, a large amount of load is generated in a process of transmitting a rotational force to an output shaft 55 by the eccentric rotation of the sun gear 51. The solution of this problem will be described in more detail in connection with a transmission unit 57 of the reducer 50 which will be described later.

Figure 9A:
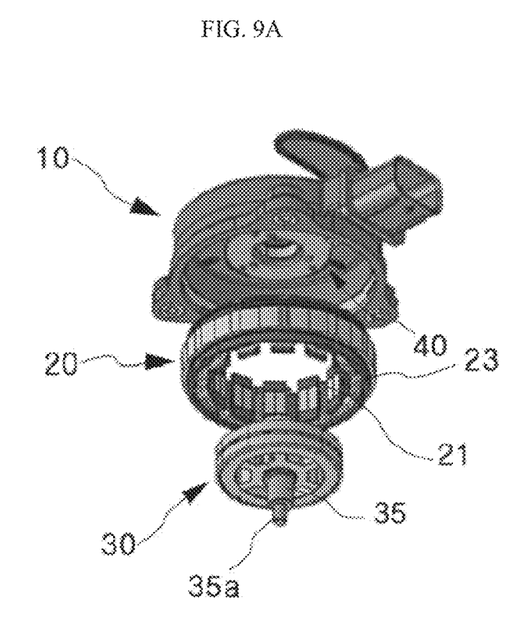
FIGS. 9A and 9B are perspective views illustrating a first inductive sensor according to the present invention.
Figure 9B:
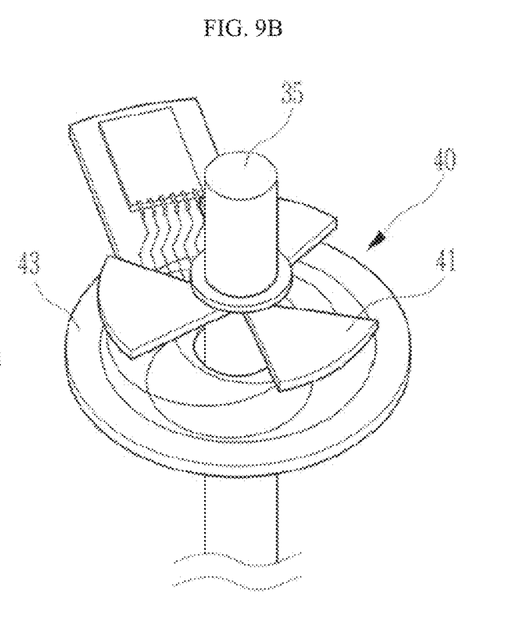

As shown in FIGS. 2, 9(A), and 9(B), the first inductive sensor 40 according to the present disclosure is composed of the conductive couplers 41 and the sensor plate 43. First, the sensor plate 43 is provided in the shape of a printed circuit board, and a coil-shaped transmitter (not shown) and a coil-shaped receiver (not shown) are disposed at positions facing the conductive couplers 41.

Figure 3:
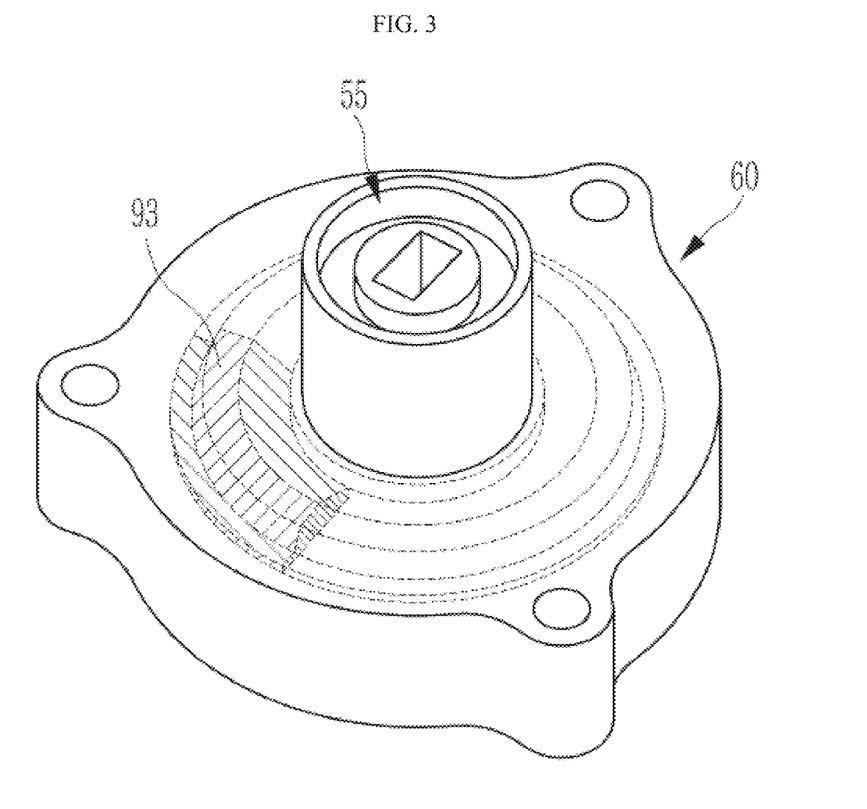
FIGS. 3 to 5 are a perspective view, a cross-sectional view, and a bottom view illustrating a second inductive sensor according to the present invention, respectively.

Further, each of the conductive couplers 41 of the first inductive sensor 40 may be composed of a single metal plate or a plurality of metal plates, and in FIG. 3 appended herein, the conductive coupler 41 having a shape in which a plurality of metal plates are disposed is shown. As described above, the conductive couplers 41 are connected to the other end of the rotary shaft 35 of the rotor 30.

Accordingly, when the rotary shaft 35 rotates, the conductive couplers 41 also rotate, and in this case, currents flow through the transmitter and thus a magnetic field is generated, and the receiver receives the magnetic field. An amount of the magnetic field received by the receiver is an amount of an electromotive force cross-changed according to whether a metal plate is present when the conductive couplers 41 rotate, an induced electromotive force (a voltage) induced from the receiver is changed, and sensing is performed by sensing a variation amount of the electromotive force.

The stator 20 and the rotor 30 according to the present disclosure are a brushless direct current (BLDC) motor-shaped driving body, and conventionally, control of the rotor 30 of the BLDC motor is composed of a Hall sensor and a multi-pole magnetized permanent magnet which control a rotation angle of the rotor 30. When an air gap is changed, the magnet and the Hall sensor have poor output and are vulnerable to shock and heat and thus a magnet demagnetization phenomenon due to overeating may be generated, and noise may be generated when foreign substances are attached to the magnet.

In order to prevent the above, in the present disclosure, a position of the motor is controlled by introducing the first inductive sensor 40 in an electromagnetic induction manner not using a magnet.

As shown in FIGS. 2 to 5, the reducer 50 according to the present disclosure includes the sun gear 51, a ring gear 53, and the output shaft 55.

First, outer teeth 51a are formed on an outer circumferential surface of the sun gear 51, and inner teeth corresponding to the outer teeth 51a are formed on an inner circumferential surface of the ring gear 53. Further, the through hole into which the eccentric portion 35a of the rotary shaft 35 is inserted is formed in a center of the sun gear 51, and the bearings 70 are disposed at the through hole of the sun gear 51 and the eccentric portion 35a of the rotary shaft 35 to support the rotary shaft 35.

Further, when the rotary shaft 35 is inserted into the output shaft 55 and thus the sun gear 51 eccentrically rotates, the rotational force may be transmitted.

That is, the sun gear 51 eccentrically rotates due to the rotation of the rotary shaft 35, and since the outer teeth 51a of the sun gear 51 rotate along the inner teeth of the ring gear 53, the sun gear 51 rotates idle in the ring gear 53. Accordingly, the rotational force is transmitted to the output shaft 55.

In this case, the transmission unit is provided to transmit the rotational force from the sun gear 51 to the output shaft 55, as the transmission unit, a coupling hole 55b is formed in a flange part 55a orthogonally connected to the output shaft 55, and a coupling protrusion (not shown) is formed on the sun gear 51 to correspond to the coupling hole 55b of the output shaft. Accordingly, since the coupling protrusion of the sun gear 51 is inserted into the coupling hole 55b of the output shaft, the rotational force of the sun gear 51 is transmitted to the output shaft 55. The coupling hole 55b and the coupling protrusion which are transmission units may be radially disposed on the flange part 55a and the sun gear 51 in plural, respectively.

Meanwhile, a multifaceted or multistage teeth-shaped transmission unit may be provided as still another embodiment of the transmission unit which transmits the rotational force from the sun gear 51 to the output shaft 55.

Generally, in the transmission unit which connects the sun gear and the output shaft, since the sun gear which eccentrically rotates is inclined, there is a problem that generates a load on the bearings which support the eccentric portion of the rotary shaft, and accordingly, transmission efficiency of the rotational force to the output shaft is reduced.

Figure 4:
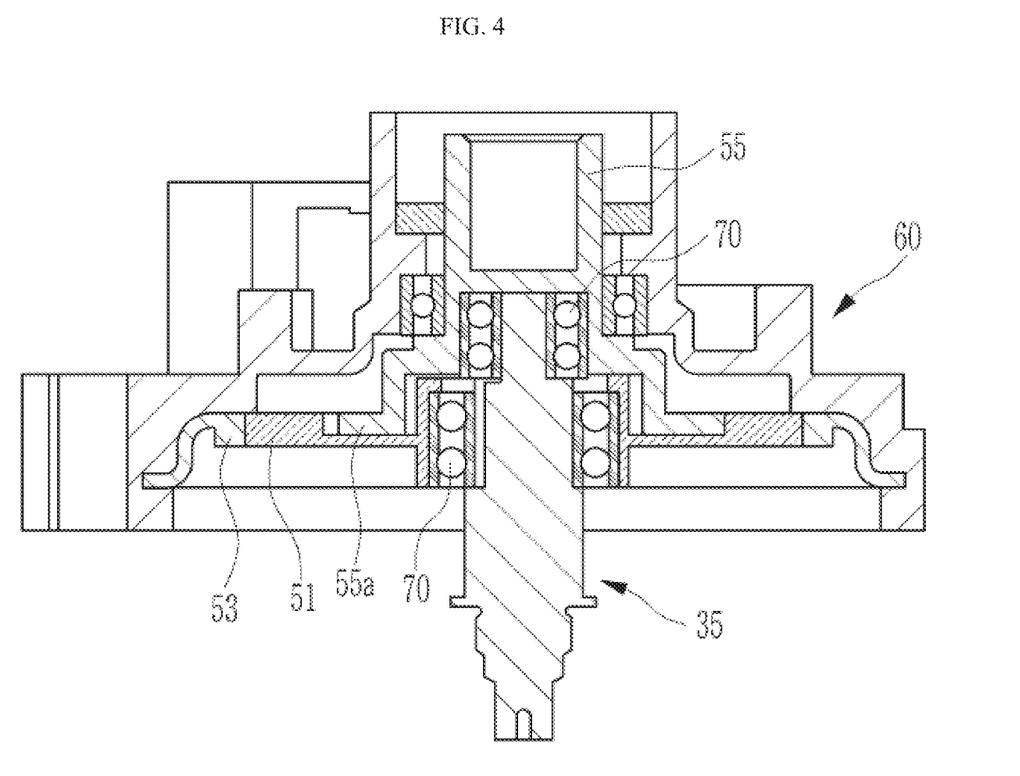

As shown in FIG. 4, the multifaceted teeth-shaped transmission unit 57 according to the present disclosure which solves the conventional problems includes the multifaceted teeth-shaped groove 57a formed in a disk portion of the sun gear 51, the flange part 55a orthogonally connected to the output shaft 55, and a multifaceted teeth-shaped protrusion 57b formed on an outer circumferential surface of the flange part 55a to be fitted into the multifaceted teeth-shaped groove 57a.

In the multifaceted teeth-shaped transmission unit 57, since the force in a rotational direction decreases when the multifaceted teeth-shaped groove 57a of the sun gear 51 and the multifaceted teeth-shaped protrusion 57b of the output shaft 55 become farther away from axial centers of the bearings 70 which support the eccentric portion 35a of the rotary shaft 35, the load applied to the bearings 70 may be reduced. Accordingly, a distance from the multifaceted teeth of the transmission unit 57 to the axial center of the bearings 70 may be arranged as far as possible.

Further, since the force of a tooth contact surface which acts on the output shaft 55 from the sun gear 51 matches in the normal direction and thus does not affect a radial force ingredient of the output shaft 55, the reduction and loss of the weight applied to the bearings 70 which support the rotary shaft 35, more specifically, the eccentric portion 35a of the rotary shaft 35, do not occur and thus transmission efficiency may be improved.

In addition, since a sliding area between the multifaceted teeth of the sun gear 51 and the multifaceted teeth of the output shaft 55 which are engaged with each other is uniform and thus a bearing is uniform, the slipping is small and abrasion may be reduced and thus deformation of the teeth may also be reduced.

In this case, when a contact groove 57c which connects the multifaceted teeth-shaped groove 57a is formed in the disk portion of the sun gear 51, and the flange part 55a of the output shaft 55 may be inserted into the contact groove 57c with contact to increase a contact area between the sun gear 51 and output shaft 55, the slipping may be reduced, and the abrasion may also be significantly reduced.

Figure 5:
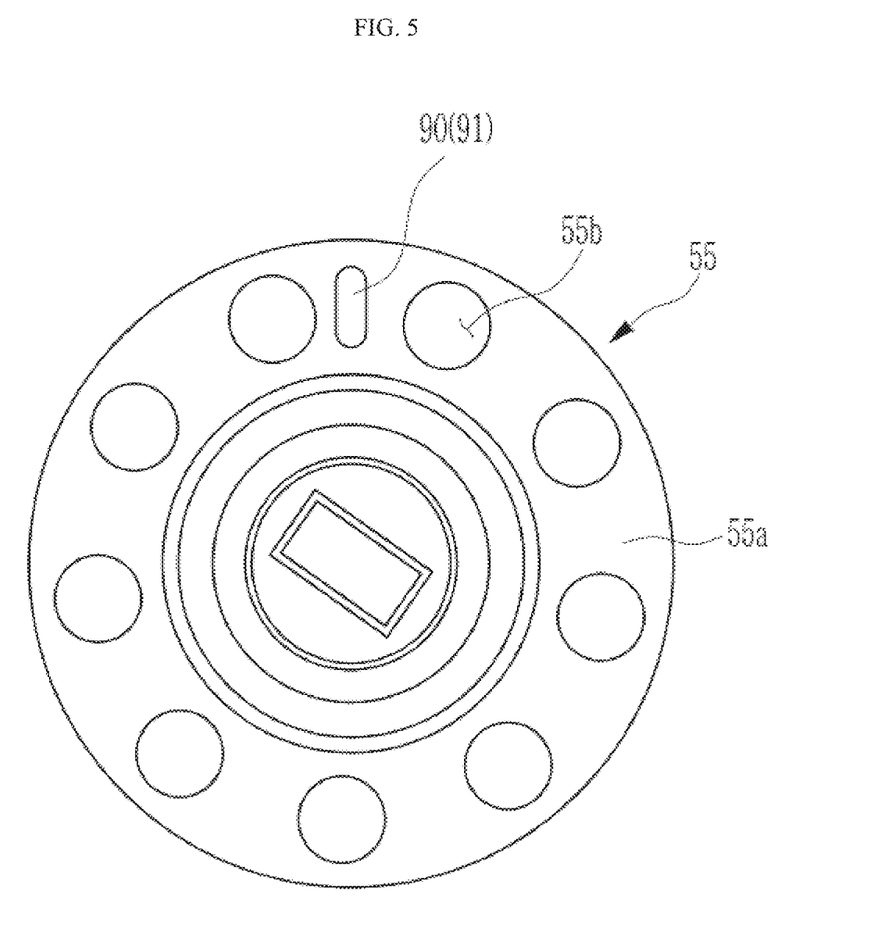

As shown in FIG. 5, a multistage teeth-shaped transmission unit 59 according to the present disclosure includes external teeth 59a inwardly forming a step on the basis of the outer teeth 51a of the sun gear 51, the flange part 55a orthogonally connected to the output shaft 55, and internal teeth 59b formed in the flange part 55a to be inscribed with the external teeth 59a.

In the multistage teeth-shaped transmission unit 59, since the force in a rotational direction decreases when the external teeth 59a of the sun gear 51 and the internal teeth 59b of the output shaft 55 become farther away from the axial centers of the bearings 70 which support the eccentric portion 35a of the rotary shaft 35, the load applied to the bearings 70 may be reduced. Accordingly, a distance from the multistage teeth of the transmission unit 59 to the axial center of the bearings 70 may be arranged as far as possible.

Further, since the force of the tooth contact surface which acts on the output shaft 55 from the sun gear 51 matches in the normal direction and thus does not affect the radial force ingredient of the output shaft 55, the reduction and loss of the weight applied to the bearings 70 which support the rotary shaft 35, more specifically, the eccentric portion 35a of the rotary shaft 35, do not occur and thus the transmission efficiency may be improved.

In addition, since a sliding area between the multistage teeth of the sun gear 51 and the multistage teeth of the output shaft 55 which are engaged with each other is uniform and thus a bearing is uniform, the slipping is small and abrasion may be reduced and thus deformation of the teeth may also be reduced.

In this case, a contact surface portion 59c which comes into contact with the disk portion of the sun gear 51 is formed in an inner side portion of the flange part 55a of the output shaft, when the contact surface portion 59c comes into contact with the disk portion to increase a contact area between the sun gear 51 and output shaft 55 in the case in which the disk portion of the sun gear 51 and the flange part 55a of the output shaft 55 are coupled to each other, the slipping may be reduced, and the abrasion may also be significantly reduced.

As shown in FIGS. 1 and 2, as described above, the reducer 50 is mounted in the second housing 60 according to the present disclosure, and an airbreather 80 is provided at an outer side portion of the second housing 60 to discharge bubbles or high pressure generated from the inside of the housing.

In this case, outer sides of the first housing 10 and the second housing 60 are provided with fastening portions corresponding to each other and thus are fastened and fixed by a bolt B, or a bolt and a nut.

Specifically, in the present disclosure, the second inductive sensor 90 which detects a rotation angle of the output shaft 55 is provided, and a reason for why the second inductive sensor according to the present disclosure is introduced will be described later.

That is, a conventional detection unit which detects the rotation angle of the output shaft is formed in a structure in which a Hall sensor mounted on the printed circuit board is provided, and a multi-pole magnetized permanent magnet is disposed at a facing position of the Hall sensor in the output shaft. In this case, since the output shaft flows slightly in a vertical direction according to the assembly state and operation state of the output shaft, the magnet of the output shaft also flows in a vertical direction like the above. Accordingly, the size of an air gap between the Hall sensor and the magnet is changed, and thus sensing accuracy of the Hall sensor is degraded. Further, since the actuator is installed on an outer space, there is a problem that moisture and foreign substances inevitably permeate and thus a gear shift may not be normally sensed.

To this end, in the present disclosure, a magnetically inductive second inductive sensor 90 in which a magnet is excluded to detect the rotation angle of the output shaft 55 is introduced.

As shown in FIGS. 3 to 5, the second inductive sensor 90 according to the present disclosure includes a metallic uneven portion 91 formed on the output shaft 55 of the reducer, and a printed circuit board 93 provided in the second housing 60, and having a transmission coil (not shown) and a reception coil (not shown) which are disposed to face the uneven portion 91.

That is, the metallic uneven portion 91 of the second inductive sensor 90 is formed on the flange part 55a of the output shaft, and as shown in FIG. 5, the uneven portion 91 may be provided in a protruding key shape (an embossed shape), and although not shown in the drawings, the uneven portion 91 may also have an intaglio key groove.

Figure 6:
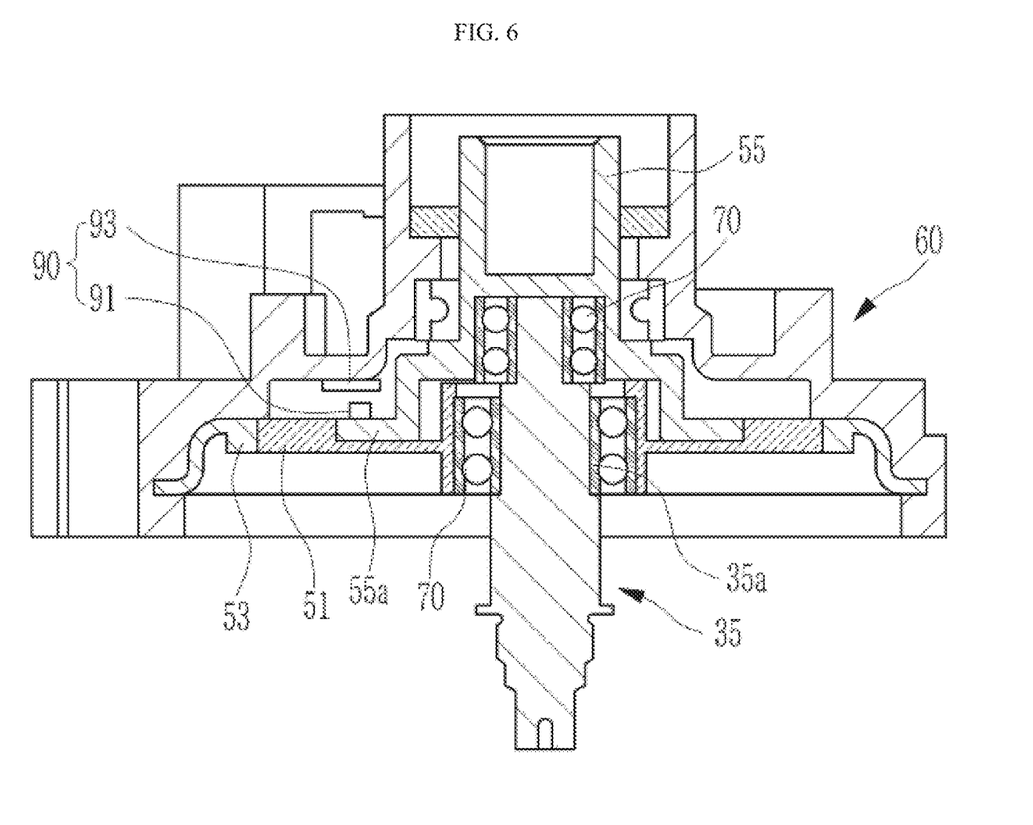
FIGS. 6, 7A, 7B, 8A and 8B cross-sectional views and perspective views illustrating another embodiment of the second inductive sensor according to the present invention, respectively.
Figure 7A:
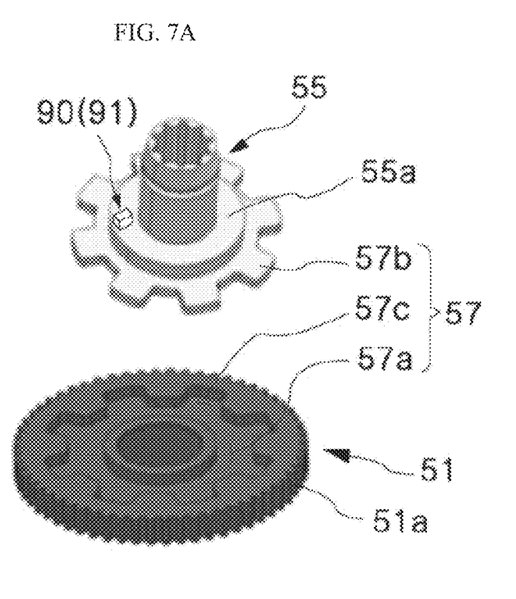
Figure 7B:
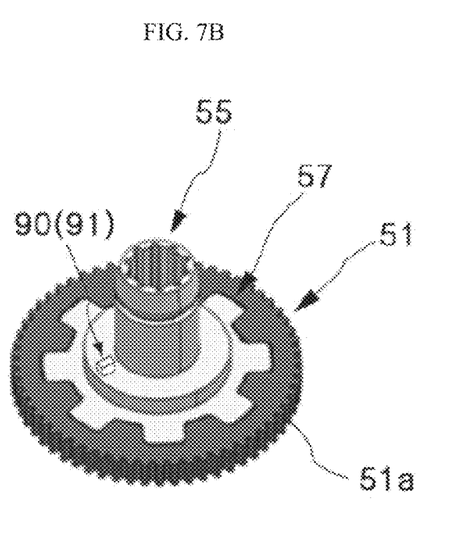
Figure 8A:
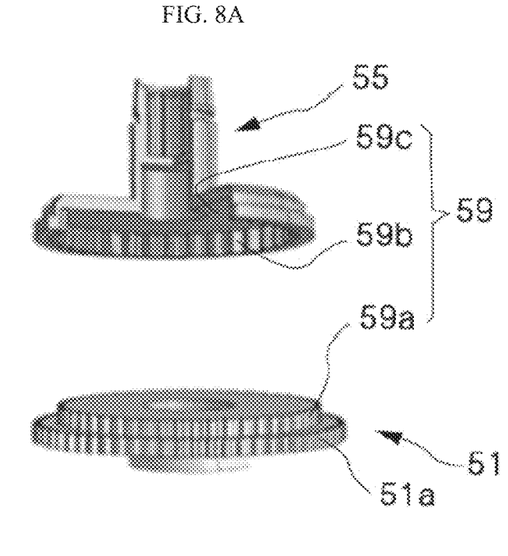
Figure 8B:
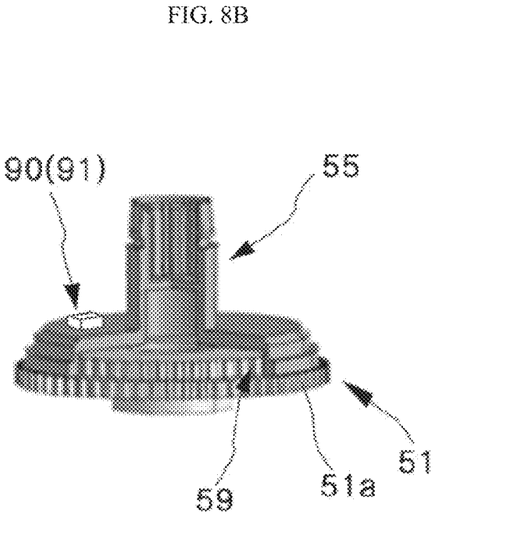

Meanwhile, as shown in FIGS. 6 to 8, when formed as a multifaceted and multistage teeth-shaped cutting unit, the uneven portion 91 of the second inductive sensor is also formed on the flange part 55a of the output shaft. Even in this case, as shown in FIGS. 6 to 8(B), the uneven portion 91 may be provided in a protruding key shape (an embossed shape), and although not shown in the drawings, the uneven portion 91 may also have an intaglio key groove.

Further, as shown in FIGS. 3 and 6, the printed circuit board 93 of the second inductive sensor is mounted on an inner side surface of the second housing 60, and the transmission coil and the reception coil disposed in the printed circuit board 93 are disposed at positions facing the uneven portion 91. In this case, an electric circuit may be connected to the transmission coil so that currents may flow.

In the above-described second inductive sensor 90, since the output shaft 55 rotates and thus the currents flow to the transmission coil and a magnetic field is generated, the magnetic field induced by the reception coil is received. The rotation angle of the output shaft is detected by measuring a variation amount in which an amount of the electromotive force which is alternately changed according to an amount of a received magnetic force line and whether the uneven portion 91 is present due to the rotation of the output shaft 55.

That is, since the magnet is not in use unlike the conventional detection unit which detects the rotation angle of the output shaft, the second inductive sensor 90 according to the present disclosure may improve detection accuracy of the rotation angle of the output shaft. Further, since the magnet is not in use, degradation of coercivity and adhesion strength due to heat may be reduced, and damage such as breakage of the magnet or the like may also be solved. First of all, low output caused when the air gap between the magnet and the Hall sensor is changed may be solved.

An inhibitor integrated actuator shift control device according to the present disclosure can improve control performance and durability through position control of a brushless direct current (BLDC) motor and a gear shift by first and second inductive sensors which do not use a magnet.

Further, the present disclosure can improve gear transmission efficiency and allow a transmission unit to be easily manufactured by introducing a multifaceted teeth-shaped transmission unit configured to connect a sun gear and an output shaft of a reducer to transmit a rotational force to reduce a load resulting from eccentric rotation of the sun gear As described above, the present disclosure is described with reference to one embodiment shown in the drawings but is only an example, and it may be understood that various modifications and other equivalents may be performed by those skilled in the art.

Accordingly, technical scope of the present disclosure should be determined by technical spirit of the appended claims.

What is claimed is:

1. An inhibitor integrated actuator shift control device comprising:
    a first housing (10);
    a stator (20) comprising a bobbin (21) and a coil (23) wound around the bobbin (21) disposed in the first housing (10);
    a rotor (30) comprising a rotor core (31) and a rotary shaft (35) connected to the rotor core (31), the rotary shaft (35) comprising an eccentric portion (35a) at one end thereof, wherein the rotor is disposed in the stator (20);
    a first inductive sensor (40) comprising conductive couplers (41) and a sensor plate (43), wherein the conductive couplers (41) are connected to an opposite end to the one end of the rotary shaft (35), and wherein the first inductive sensor (40) is disposed in the first housing (10);

a reducer (50) comprising a sun gear (51), a ring gear (53) and an output shaft (55), wherein the sun gear (51) is connected to the eccentric portion (35a) of the rotary shaft (35) to rotate eccentrically, the ring gear (53) is inscribed with the sun gear (51), and the output shaft (55) is connected to the sun gear (51) to transmit a rotational force;

a second housing (60) in which the reducer (50) is disposed; and a magnetically inductive second inductive sensor (90) on a flange part (55a) of the output shaft (55) configured to detect a rotation angle of the output shaft (55), wherein the sun gear (51) comprises teeth shaped grooves (57a) formed on a disk portion of the sun gear (51), and wherein the flange part (55a) of the output shaft (55) further comprises multifaceted teeth shaped protrusions (57b) configured to fit into the teeth-shaped grooves (57a) of the sun gear (51).

2. The inhibitor integrated actuator shift control device of claim 1, wherein the second inductive sensor (90) comprises a metallic uneven portion (91) formed on the output shaft (55), and a printed circuit board (93) provided in the second housing (60), the printed circuit board comprising a transmission coil and a reception coil which are disposed to face the uneven portion (91).

3. The inhibitor integrated actuator shift control device of claim 2, wherein the reducer (50) further comprises a multistage teeth-shaped transmission unit (59) configured to connect the sun gear (51) and the output shaft (55).

4. The inhibitor integrated actuator shift control device of claim 3, wherein the multistage teeth-shaped transmission unit (59) of the sun gear (51) comprises a base stage and an additional stage over the base stage inwardly forming a step with respect to the base stage, the additional stage comprising an external teeth (59a) and the base stage forming an outer teeth (51a), wherein the the output shaft (55) further comprises an internal teeth (59b) formed in the flange part (55a) to be inscribed with the external teeth (59a).

5. The inhibitor integrated actuator shift control device of claim 4, wherein an inner side portion of the flange part (55a) is further provided with a contact surface portion (59c) which comes into contact with the sun gear (51).

6. The inhibitor integrated actuator shift control device of claim 2, wherein the metallic uneven portion (91) of the second inductive sensor is formed on the flange part (55a) of the output shaft.

7. The inhibitor integrated actuator shift control device of claim 1, wherein the disk portion of the sun gear (51) further comprises a contact groove (57c) connected to the multifaceted teeth-shaped groove (57a) to come into contact with the flange part (55a) of the output shaft (55) to expand a contact area.

8. The inhibitor integrated actuator shift control device of claim 1, wherein the conductive coupler (41) of the first inductive sensor includes a single metal plate or a plurality of metal plates.

* * * * *